United States Patent [19]

Buchas

[11] 4,395,665

[45] Jul. 26, 1983

[54] CONTROL SYSTEM FOR VIBRATING A MEMBER AT ITS RESONANT FREQUENCY

[75] Inventor: Gerald L. Buchas, Forestville, Conn.

[73] Assignee: The Arthur G. Russell Company, Incorporated, Bristol, Conn.

[21] Appl. No.: 271,819

[22] Filed: Jun. 9, 1981

[51] Int. Cl.³ .............................................. H02P 5/40

[52] U.S. Cl. ..................................... 318/114; 318/127

[58] Field of Search ............... 318/114, 126, 127, 128, 318/129, 130

[56] References Cited

U.S. PATENT DOCUMENTS 4,038,588 7/1977 Woolfson et al. .................. 318/127

4,086,518 4/1978 Wilkinson ........................... 318/127

FOREIGN PATENT DOCUMENTS 733079 5/1980 U.S.S.R. .............................. 318/114

*Primary Examiner*—J. V. Truhe

*Assistant Examiner*—A. Evans

*Attorney, Agent, or Firm*—McCormick, Paulding & Huber

[57] ABSTRACT

A control system is disclosed for use with a device, such as a vibratory bowl feeder, having a bowl or other member mounted for vibratory motion and including an electromagnetic driver for vibratorily driving the part. The control system includes a detector for detecting the vibratory frequency of the part, which tends to vibrate at its resonant frequency, and causes energizing pulses of power to be supplied to the driver supplied at a frequency equal to the detected frequency. Thus, the driving frequency is made equal to the resonant frequency and follows changes in such frequency to obtain maximum performance. The power to the drivers is also switched so that during alternate pulses the current flows through the driver coil in opposite directions to inhibit buildup of residual magnetism in the coil core. The control system uses a phase-locked loop circuit and other parts comprised of components most of which are available as standard integrated circuits. A means for selectively varying the amplitude of member vibration is also included in the control system.

14 Claims, 1 Drawing Figure

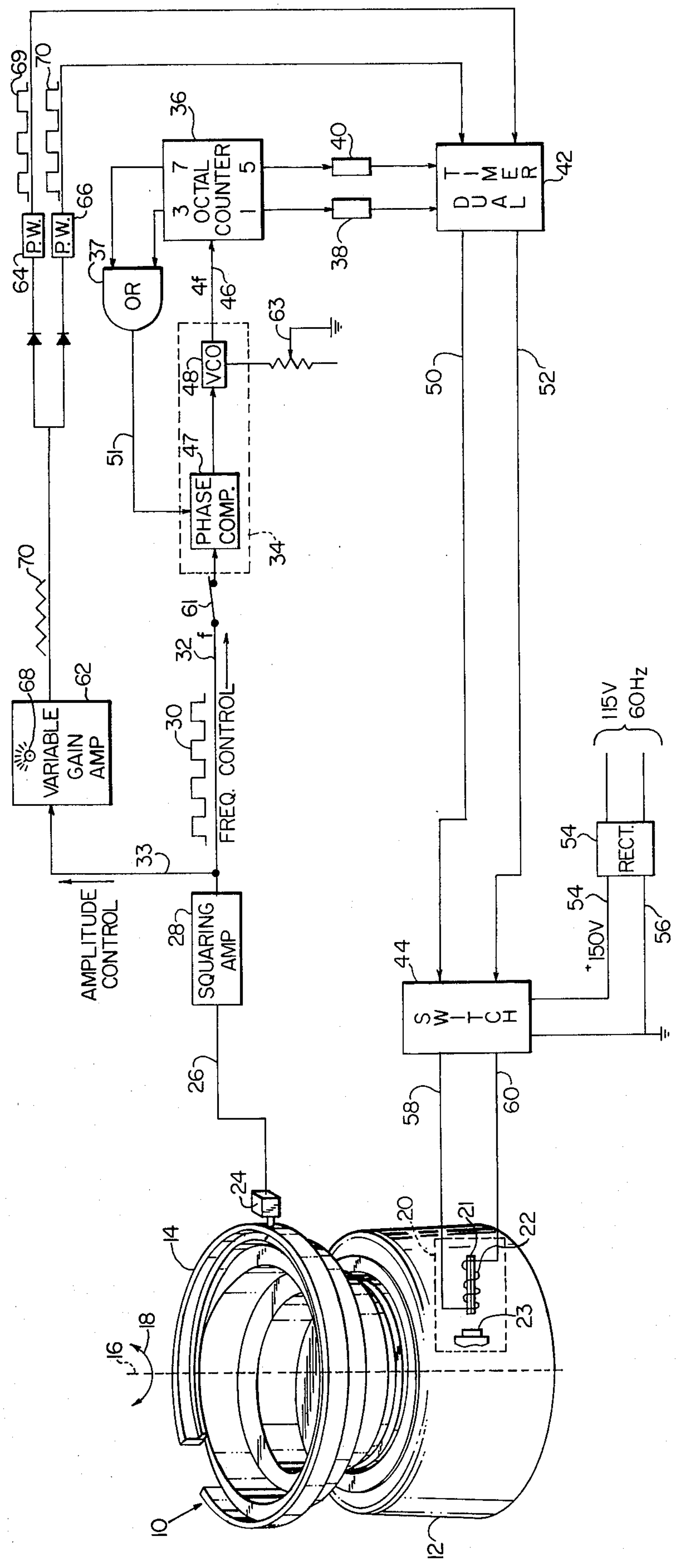
P.W.
P.W.
OCTAL COUNTER
DUAL TIMER
OR
VCO
PHASE COMP.
VARIABLE GAIN AMP
FREQ. CONTROL
AMPLITUDE CONTROL
SQUARING AMP
SWITCH
RECT.
115V 60Hz
+150V
4f
f

CONTROL SYSTEM FOR VIBRATING A MEMBER AT ITS RESONANT FREQUENCY

BACKGROUND OF THE INVENTION

This invention relates to a control system for use in driving a vibratory member, and deals more particularly with such a control system for driving the member at its resonant frequency.

Many machines or devices have members supported for vibration and driven in such vibration by an electromagnetic driver; and often it is desired that such a member be driven at or near its resonant frequency. An example of such device is a vibratory bowl feeder having a bowl supported by springs for movement relative to a base and vibrated relative to the base by one or more electromagnetic drivers. To obtain maximum efficient use of the power applied to such a feeder, and to obtain best performance of the feeding function, it is usually desired that the driver or drivers drive the bowl at its resonant frequency. The driving frequency is typically fixed by the frequency of the power supply, for example 60 Hz, and a match between the driving frequency and the bowl resonant frequency is usually obtained by tuning the bowl to cause it to have a resonant frequency equal to the power supply frequency. This bowl tuning, which may for example be done by adjusting the weight or weight distribution of the bowl or the spring rate of its suspension, is usually a relatively time consuming one. Furthermore, after a bowl is tuned it tends to go out of tune after a period of usage so that to maintain optimum performance the bowl should be frequently retuned.

Also, in many cases the optimum design resonant frequency of the feeder bowl or other member in question is substantially different from the frequency of the available power supply. In the past such mismatches have been troublesome as it has generally been difficult and expensive to provide frequency converters or other devices to energize the driver or drivers at a frequency other than that of the power supply.

The purpose of the invention is, therefore, to provide a control system for use with a driven vibratory member whereby the member is driven at its resonant frequency, so that no exact tuning of the member is required, and whereby the driving frequency follows changes in the member's resonant frequency so that changes in such resonant frequency will not adversely effect the member's performance.

A further object of the invention is to provide a control system for an electromagnetically driven vibratory member wherein the control system may be operated in an open-loop mode and its output frequency adjusted to cause said output frequency to match the member's resonant frequency and wherein the control system may thereafter be operated in a closed loop mode to cause its output frequency to follow changes in the member's resonant frequency.

Another object of the invention is to provide a control system of the foregoing character which may be used with a constant frequency power supply to drive a vibratory member at any desired frequency within a wide range of frequencies.

Another object is to provide a control system for a vibratory drive which is more efficient, which generates less heat and which can be made in a smaller size than presently available control systems serving the same general purpose.

Still another object of the invention is to provide a control system such as aforesaid which may easily and economically be made by using to a large extent components available as standard integrated circuits.

Other objects and advantages of the invention will be apparent from the following detailed description and from the drawing forming a part hereof.

SUMMARY OF THE INVENTION

This invention resides in a control system for use with a device having a member supported for vibratory motion and one or more electromagnetic drivers for driving it in such motion, the control being such that each driver is excited or driven at the same frequency as the resonant frequency of the member with changes in such resonant frequency causing corresponding changes in the driving frequency.

The invention also resides in the control system including a phase comparator, a voltage controlled oscillator, and a counter connected to form a phase-locked loop, the phase-locked loop performing a comparison between the natural resonant frequency of the vibrating member, as detected by a frequency detector, and the output of the voltage controlled oscillator. The phase-locked loop produces an error signal which, when applied to the voltage controlled oscillator, causes that device, in an error signal nulling manner, to produce an output of substantially the same frequency as the natural resonant frequency of the vibrating member, thus providing an optimum driving frequency for the vibrating member.

The invention also more specifically resides in the above mentioned phase-locked loop, particularly the counter, serving as a frequency divider which, in conjunction with a pair of one-shot multivibrators, spaces and apportions and directs pulses of electric current to drive power transistors, or other switch means, which switch power from a DC source in alternating directions through the coil of each electromagnetic driver—that is, one pulse of electric current is supplied to each coil during each full movement cycle of the vibratory member and the current flows in opposite directions through the coil in alternate cycles of such vibratory movement.

The invention also resides in a means responsive to both a manual setting and to a measured signal proportional to the actual amplitude of the vibrating member, the action of which means tends to maintain the member's amplitude at a constant value over a wide range of disturbing conditions.

BRIEF DESCRIPTION OF THE DRAWING

The drawing shows in schematic form a control system embodying this invention used in connection with a vibratory bowl feeder.

DESCRIPTION OF THE PREFERRED EMBODIMENT

Turning to the drawing, a control system embodying this invention is there, by way of example, shown in association with a vibratory bowl feeder 10 of generally conventional construction. The feeder 10 has a relatively massive base 12 intended to be fixedly supported by a table or other means. The feeder also includes a vibratory bowl 14 supported by springs or the like for vibratory motion relative to the base 12 generally about the central axis 16, as indicated by the arrow 18. Between the base 12 and the bowl 14 are one or more electromagnetic drivers which drive the bowl 14 in its vibratory motion relative to the base 12. These drivers may take various different forms, and in the figure one driver is indicated schematically at 20. It includes a core 21, which may be taken to be fixed to the base 12, a surrounding coil 22, to which input electrical current is supplied, and an armature 23, which may be taken to be fixed to the bowl 14. Although only one electromagnetic driver 20 is shown it should be understood that the feeder may include a number of such drivers operated in unison. In particular, the feeder 10 and its drivers may, if desired, be generally similar to that shown by FIGS. 1 to 8 of U.S. Pat. No. 3,048,260, to Grant N. Willis, to which reference may be had for further details of its construction.

Also, it should be noted that the direction of flow of current through the coil 22 of the driver 20 does not effect its direction of drive. That is, whenever current flows through the coil 22 of the core 21 will attract the armature 23 to move the bowl 14 in the same direction regardless of the direction of current flow. It has therefore been common practice to have the current flow through the coil 22 in the same direction during each energization of the coil. This, however, causes residual magnetism to build up in the core 21 which, unchecked, can severely reduce the efficiency of the driver. In the past various measures have been proposed to deal with this problem, most of which have involved complicated, expensive, heat generating control systems, and one aspect of this invention is to eliminate the disadvantages of such controls by providing a control system causing the current to flow through the coil 22 in opposite directions during alternate energizations.

As to the control system of the invention, associated with the bowl 14 of the feeder 10 is a frequency detector 24 which produces an electrical output signal on the line 26 having a frequency equal to that of the bowl's vibratory frequency. The detector 24 may be of any well known type as, for example, an optical-electrical one wherein the detector has a stationary housing containing optical sensing means responsive to motion of a small tab or other part fixed to the bowl 14.

The output of the frequency detector 24 is supplied to a squaring amplifier 28 which converts it into a square wave, such as indicated at 30, having a frequency equal to that of the frequency detector signal. This squared waveform is supplied both to a frequency control circuit by way of the line 32 and to an amplitude control circuit by way of the line 33.

The frequency control circuit includes a phase-locked loop circuit including an integrated circuit 34, a counter 36 with built-in code converter and an OR gate 37. It also includes two spike generating circuits 38 and 40 and a dual timer 42 and a switch circuit 44 shared with the amplitude control circuit.

The integrated circuit 34 is basically comprised of a phase comparator 47 and a voltage controlled oscillator 48. If the frequency of the input signal to the circuit 34 is f, the frequency of the output signal appearing on the line 46 is Nf, where N is an integer. Without departing from the invention, the integer N may vary and, for whatever integer N is chosen, the counter 36 is accordingly chosen to be a divide by 2N counter. However, preferably and as shown, the circuit 34 is one designed to have an output frequency equal to four times the input frequency and the counter 36 is an octal or divide by eight counter. As will be evident from the drawing and from the following description, two outputs of the counter are used to provide feedback pulses for the circuit 34 and two others are used to provide pulses timing the switching of power to the driver 20, and therefore the net frequency division of the counter is by a divisor of four—that is one feedback pulse is provided from the counter 36 for every four input pulses to it, and one timing pulse is likewise provided by the counter 36 for every four input pulses to it. The feedback pulses and the timing pulses from the counter 36 therefore appear at the same frequency as the input pulses to the circuit 34. The circuit 34 and the counter 36 may be supplied as standard integrated circuit components with the circuit 34 being, for example, a CD4046 integrated phase-locked loop circuit produced by Signetics, Inc. and the counter 36 being a CD4022 octal counter with code converter integrated circuit also produced by Signetics, Inc.

More particularly, the output terminals of the counter 36 associated with the counts of "3" and "7" are connected through the OR gate 37 as a feedback to the phase comparator 47. The counter 36 therefore feeds back a signal to the phase comparator 46 having, under locked coditions, the same frequency as the input signal appearing on the line 32. If the input frequency changes the phase detector 46 adjusts the voltage controlled oscillator 48 to adjust the output frequency of the signal appearing on the line 46 to keep the frequency of the feedback signal, on the line 51, equal to the frequency of the input signal on the line 32.

For timing the application of power to the driver 20 the counter has its count of "1" and count of "5" output terminals respectively connected to the spike circuits 38 and 40. The dual timer 42 consists of a set of two one-shot multivibrators and may, for example, be an SE 556-IN integrated circuit supplied by Signetics, Inc. One of these multivibrators is triggered into a conducting state by spikes issuing from the spike circuit 38 and the other is triggered by spikes issuing from the spike circuit 40. Each time the first one-shot multivibrator is triggered it produces an output pulse on the line 50 and each time the other is triggered it produces an output pulse on the line 52.

The spike circuit 38 produces a spike each time a pulse representing the count of "1" appears at the counter 36, and likewise the spike circuit 40 produces a spike each time a pulse representing the count of "5" appears at the counter 36. Therefore, the pulses appearing on the output lines 50 and 52 alternate with one another, are equally time spaced relative to one another, and appear at a combined frequency equal to the frequency of the bowl vibration.

The switch 44 is associated with a rectifier 54 which rectifies input alternating power, such as 115 v. 60 Hz power, to a DC supply, such as the indicated +150 v. supply appearing across the lines 54 and 56. The switch directs power from the rectifier to flow in opposite directions through the coil 22 during alternate energizations of the coil. It may take various different forms and may for example consist of four power transistors connected in bridge fashion between the rectifier and the coil so that when a first two of the transistors are turned ON and the other two OFF current will flow through the coil in one direction and when the two are turned ON and the first two OFF current will flow through the other coil in the opposite direction. In any event, the switch 44 has two output lines 58 and 60 connected to the coil 22 of the driver 20. Upon the appearance of a pulse on the line 50 the switch connects the positive voltage line 54 to the line 58 and the ground line 56 to the line 60 to cause direct current to flow through the coil 22 in one direction. When a pulse appears on the line 52 the switch 44 is conditioned to connect the positive voltage line 54 to the line 60 and the ground line 56 to the line 58 to cause the direct current to flow through the coil 22 in the opposite direction. Therefore, the coil 22 is energized with pulses of current appearing at a frequency equal to the bowl movement frequency causing the driver 20 to mechanically vibrate the bowl at that frequency, and in alternate pulses the current flows in opposite directions through the coil thereby inhibiting the buildup of residual magnetism in the core 21.

From the foregoing, it will be understood that in normal operation of the feeder 10 its bowl 14 tends to vibrate at a resonant frequency. This frequency is detected by the detector 24 and through the illustrated frequency control system causes the driver 22 to be excited at the same frequency. If the resonant frequency of the bowl 14 varies the phase-locked loop circuit changes its output frequency, on the line 46, in a corresponding manner, and this change, through the counter 36, dual timer 42 and switch 44, causes the frequency at which the driver 20 is excited to follow the change in the resonant frequency.

It should also be noted from the drawing that the circuit 34 is connected to the output from the squaring amplifier 28 through a manually operable switch 61 and that the voltage controlled oscillator 48 of the circuit 34 has a center frequency which is manually adjustable as, for example, by means of the illustrated potentiometer 63. When the switch 61 is open the voltage controlled oscillator will produce an output signal having a frequency equal to its center frequency. Thus, if desired, the control may be operated in an open loop manner by opening the switch 61 and then adjusting the potentiometer 63 to manually control the frequency of the voltage controlled oscillator 48 and to consequently manually control the frequency at which the driver 20 is energized. When the switch 61 is closed the control operates in a closed loop mode as described in detail above to cause the frequency of driver energization to equal substantially the resonant frequency of the bowl, and the control has the capacity to handle bowl frequencies which depart from such center frequency by plus or minus ten percent or more.

A given control system according to this invention may therefore be readily adjusted to any given bowl feeder, or other vibrating member with which it is used, by first running the control in an open loop mode, that is with the switch 61 open, and adjusting the potentiometer 63 until the frequency at which the driver 20 is energized seems by visual and/or audible observation to match or nearly match the resonant frequency of the bowl. After this adjustment is made, the switch 61 is closed, and the control will then operate in a closed loop mode causing the driver 20 to be energized at or very near the resonant frequency of the bowl and causing such energizing frequency to follow variations in the bowl resonant frequency.

The duration of the pulses appearing on the output lines 50 and 52 of the dual timer control the duration of application of electrical power to the driver 20 during each energization thereof, and therefore the amplitude of bowl vibration is directly related to the duration of these pulses. To allow for control of the bowl amplitude, the control system has an amplitude control circuit which includes a variable gain amplifier 62 and two pulse width determining circuits 64 and 66. The amplifier 62 has a manually operable knob 68 or the like by which its gain may be adjusted, and it serves to convert the output from the squaring amplifier 28 into a triangular waveform such as shown at 70. The triangular waveform is in turn fed simultaneously to the two circuits 64 and 66 each of which is a voltage threshold circuit which produces an output pulse persisting for so long as the waveform 70 exceeds a given threshold voltage. Therefore, the durations of the pulses, such as indicated at 69 and 70, issuing from the circuits 64 and 66 depends on the steepness of the sides of the triangular waveform 70 which in turn depends on the setting of the gain adjustment knob 68. The two trains of pulses 69, 69 and 70, 70 are in turn transmitted to the dual timer 42. The duration of the pulses 69, 69 determine the durations of the output pulses from one of the one-shot multivibrators of the dual timer, and the durations of the pulses 70, 70 determine the durations of the output pulses from the other of the one-shot multivibrators. Thus, it will be understood that by merely moving the gain adjustment knob 68 the amplitude of bowl vibration may be selectively adjusted and that the selected amplitude will thereafter be automatically maintained over a wide range of disturbing conditions.

I claim:

1. A control system for drivingly vibrating a member at its resonant frequency, said control system comprising:

- an electromagnetic drive means for said member;
- a means separate from said electromagnetic drive means for detecting the vibratory movement of said member and for producing a detected frequency electrical signal having a frequency exactly equal to the vibratory frequency of said member; and
- a means responsive to said detected frequency signal for exciting said electromagnetic drive means with electrical power at a frequency exactly equal to that of said detected frequency signal so that said drive means drives said member at exactly the same frequency as that detected by said detecting means.

2. For use with a device having a member supported for vibratory motion and an electromagnetic driver including a coil surrounding a core, a control system for causing said driver to drivingly vibrate said member at the member's resonant frequency, said control system comprising:

- a means separate from said electromagnetic driver for detecting the vibratory movement of said member and for producing a detected frequency electrical signal having a frequency exactly equal to the vibratory frequency of said member; and
- a means respnsive to said detected frequency signal for producing an electrical drive signal supplied to said driver, said electrical drive signal consisting of spaced pulses of electrical current constrained to flow in opposite directions through said coil of said driver during alternate ones of said pulses and which pulses appear at a frequency exactly equal to that of said detected frequency signal.

3. A control system as defined in claim 2 further characterized by said means for producing an electrical drive signal including a source of D.C. power, and a switching means connected between said source and said coil for switching between one state at which power from said source is connected to flow in one direction through said driver coil and a second state at which power from said source is connected to flow in the other direction through said driver coil, and means for switching said switching means between said first and second states at a frequency directly related to the frequency of said detected frequency signal.

4. A control system as defined in claim 3 further characterized by said means for controlling said switching means including a phase-locked loop circuit.

5. For use with a device having a member supported for vibratory motion and an electromagnetic driver including a coil surrounding a core, a control system for causing said driver to drivingly vibrate said member at the member's resonant frequency, said control system comprising:

a means for detecting the vibratory movement of said member and for producing a detected frequency electrical signal having a frequency equal to the vibratory frequency of said member;

a means responsive to said detected frequency signal for producing an electrical drive signal supplied to said driver, said electrical drive signal consisting of spaced pulses of electric current constrained to flow in opposite directions through said coil of said driver during alternate ones of said pulses and which pulses appear at a frequency equal to that of said detected frequency signal;

said means for producing an electrical drive signal including a source of D.C. power, a switching means connected between said source and said coil for switching between one state at which power from said source is connected to flow in one direction through said driver coil and a second state at which power from said source is connected to flow in the other direction through said driver coil, and means including a phase-locked loop circuit for switching said switching means between said first and second states at a frequency directly related to the frequency of said detected frequency signal, said phase-locked loop circuit including a phase comparator and a voltage controlled oscillator, said phase comparator having said detected frequency signal as an input thereto, and said voltage controlled oscillator having an output frequency equal to Nf where f is the frequency of the input signal to the phase comparator and N is an integer, a divide by 2N counter with 2N decoded outputs, and two one shot multivibrators each connected with a different one of the outputs of said counter for producing, in combination, two trains of pulses the pulses of which alternate in time and which are supplied to said switching means to switch said switching means between its first and second states.

6. A control system as defined in claim 5 wherein said voltage controlled oscillator has a frequency equal to four times the frequency of the signal input to said phase comparator and wherein said counter is a divide by eight counter.

7. A control system as defined in claim 5 further characterized by means for selectively controlling the duration of the output pulses produced by said two one shot multivibrators to selectively control the amplitude at which said member is driven by said driver.

8. A control system as defined in claim 5 further characterized by a means for selectively connecting and disconnecting said pulse comparator to and from said detected frequency signal, said voltage controlled oscillator having a center frequency at which it runs when said detected frequency signal is disconnected from said phase comparator, and means for selectively varying said center frequency of said voltage controlled oscillator.

9. A control system for use with a device having a member supported for vibratory motion and an electromagnetic driver including a coil surrounding a core, said control system comprising:

a means for detecting the vibratory movement of said member and for producing a detected frequency electrical signal having a frequency corresponding to the vibratory frequency of said member;

a phase-locked loop circuit including a phase comparator having said detected frequency signal as an input thereto, a voltage controlled oscillator connected to the output of said phase comparator, a counter connected to the output of said voltage controlled oscillator, and means connecting at least one of the output terminals of said counter to said phase comparator to provide a feedback signal with which said detected frequency input signal is compared;

a means providing a source of DC power;

a switching means connected between said source of DC power and said driver coil and switchable between one state in which current from said DC source is connected to flow in one direction through said driver coil and a second state in which current from said DC source is connected to flow in the other direction through said driver coil; and means responsive to the output signals appearing at at least one of the output terminals of said counter for alternately switching said switching means between said first and second states.

10. A control system for use with a device having a member supported for vibratory motion and an electromagnetic driver including a coil surrounding a core, said control system comprising:

a means for detecting the vibratory movement of said member and for producing a detected frequency electrical signal having a frequency corresponding to the vibratory frequency of said member;

a phase-locked loop circuit including a phase comparator having said detected frequency signal as an input thereto, a voltage controlled oscillator connected to the output of said phase comparator, a counter connected to the output of said voltage controlled oscillator, said voltage controlled oscillator having an output frequency equal to N times the frequency of the signal input to said phase comparator and said counter being a 2N counter with a code converter and 2N output tereminals, and an OR gate connecting two of said output terminals of said counter to said phase comparator to provide a feedback signal with which said detected frequency input signal is compared;

a means providing a source of DC power;

a switching means connected between said source of DC power and said driver coil and switchable between one state in which current from said DC source is connected to flow in one direction through said driver coil and a second state in which current from said DC source is connected to flow in the other direction through said driver coil; and means responsive to the output signals appearing at two other output terminals of said counter for alternately switching said switching means between said first and second states.

11. A control system as defined in claim 9 or 10 further characterized by a switch between said vibratory movement detector and said phase comparator for selectively connecting and disconnecting said detected frequency electrical signal to and from said phase comparator, said voltage controlled oscillator having a center frequency at which it runs when said switch is set to disconnect said detected frequency electrical signal from said phase comparator, and means for selectively adjusting said center frequency of said voltage controlled oscillator.

12. A control system as defined in claim 10 further characterized by two one-shot multivibrators each connected to a respective one of said other two terminals of said counter for producing output pulses which control the switching of said switching means.

13. A control system as defined in claim 12 further characterized by means for controlling the duration of the output pulses produced by said two one-shot multivibrators to selectively control the amplitude at which said member is driven by said driver.

14. A control system as defined in claim 13 further characterized by said means for controlling the duration of the output pulses produced by said two one-shot multivibrators including a means responsive to both a manual setting and to the output of said vibratory movement detecting means for automatically maintaining the amplitude of said bowl vibration at a substantially constant value.

* * * * *